(12) United States Patent
Abe et al.

(10) Patent No.: US 7,612,477 B2
(45) Date of Patent: Nov. 3, 2009

(54) ELECTROMAGNETIC BRAKE DEVICE FOR SMALL-SIZED MOTOR

(75) Inventors: Toshiyuki Abe, Minamiazumi-gun (JP); Kiyoto Kobayashi, Minamiazumi-gun (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 11/910,267

(22) PCT Filed: Apr. 22, 2005

(86) PCT No.: PCT/JP2005/007681

§ 371 (c)(1), (2), (4) Date: Sep. 30, 2007

(87) PCT Pub. No.: WO2006/114881

PCT Pub. Date: Nov. 2, 2006

(65) Prior Publication Data

US 2008/0191567 A1   Aug. 14, 2008

(51) Int. Cl.
H02K 7/10 (2006.01)
(52) U.S. Cl. ........................................... 310/90; 310/77
(58) Field of Classification Search ............... 310/90, 310/76–78, 92, 93
See application file for complete search history.

(56) References Cited

U.S. PATENT DOCUMENTS 2,701,036 A * 2/1955 Osborne ..................... 188/171
2,911,548 A * 11/1959 Joy et al. ..................... 310/77
4,663,550 A 5/1987 Kawada et al.

FOREIGN PATENT DOCUMENTS

| JP | 09-049536 | 2/1997 |
|----|-----------|--------|
| JP | 2005-090567 | 4/2005 |
| WO | 85/02952 | 7/1985 |

* cited by examiner

Primary Examiner—Dang D Le
(74) Attorney, Agent, or Firm—Buchanan Ingersoll & Rooney PC

(57) ABSTRACT

An electromagnetic brake device (3) is assembled to a rear end section of a small-sized motor (1). The electromagnetic brake device (3) has a rotating disc (11) fixed to a motor rotation shaft (4), a sliding disc (12) slidable in an axial direction, a coil spring (13) pressing the sliding disc (12) to the rotating disc (11), and an electromagnet (14) capable of attracting the sliding disc (12) against spring force. A circular recess (16e) is formed in the center of a rear end surface of a yoke (16) of the electromagnet (14). In a state where the electromagnetic brake device (3) is assembled, a bearing (6) supporting a rear end shaft section (4b) of the motor rotation shaft is received in the circular recess (16e). As a consequence, no large circular dead space is produced at a portion on the outer periphery side of the bearing (6), which portion is between a motor end plate (5) and a rear end surface of the electromagnetic brake device (3). As a result, the length of the shaft of the small-sized motor (1) is suppressed from increasing.

2 Claims, 2 Drawing Sheets

PRIOR ART

ELECTROMAGNETIC BRAKE DEVICE FOR SMALL-SIZED MOTOR

TECHNICAL FIELD

The present invention relates to an electromagnetic brake device for locking rotation of a motor, and especially to an electromagnetic brake provided with a structure suitable for installation into a small-sized motor.

BACKGROUND ART

Sometimes a motor is equipped with an electromagnetic brake device for locking a motor rotation shaft at a specified position. As shown in FIG. 2; an electromagnetic brake device 100, which is commonly used, includes a rotating disc 101 fixed to a motor rotation shaft 200, a sliding disc 102 that is slidable in a direction so as to come close to and move away from the rotating disc 101, a spring member 103 that presses the sliding disc 102 against the rotating disc 101, and an electromagnet 104 that pulls the sliding disc 102 in a direction for moving away from the rotating disc 101 while being against spring force of the spring member 103.

Under a condition where the electromagnet 104 is not excited, the sliding disc 102 is pressed against the rotating disc 101 with the spring force. As a result, due to frictional force between the sliding disc 102 and the rotating disc 101, braking force acts on the motor rotation shaft 200 so that the motor rotation shaft 200 gets locked. Contrarily, when the electromagnet 104 is excited, the sliding disc 102 is pulled while being against the spring force, so that the braking force is canceled and the motor rotation shaft 200 becomes rotatable freely.

As a whole, the electromagnetic brake device 100 is shaped like a cylindrical form having a specified length; and while the motor rotation shaft 200 being placed through a center shaft hole 105 of the electromagnetic brake device 100, the electromagnetic brake device 100 is assembled into a rear end section of a motor. Furthermore, a rear end shaft part 201 of the motor rotation shaft 200, which goes through the center shaft hole 105 of the electromagnetic brake device 100 and protrudes from a rear end side, is generally supported through an intermediary of a bearing 202 by a motor end plate 203. In such a case, there appears a dead space 300 shaped like a ring, at an outer surrounding section of the bearing 202, between a rear end surface 100a of the electromagnetic brake device 100 and the motor end plate 203.

DISCLOSURE OF THE INVENTION

In view of the problem described above, it is an object of the present invention to provide an electromagnetic brake device that can be assembled into a small-sized motor without making up the dead space.

Furthermore, it is an object of the present invention to provide an electromagnetic brake built-in type small-sized motor, which is equipped with an electromagnetic brake device built in and short in a shaft length, without making up the dead space.

To solve the problems identified above, an electromagnetic brake device according to the present invention includes:

a rotating disc fixed to a motor rotation shaft so as to rotate together with the motor rotation shaft;

a sliding disc that is slidable along an axial line of the motor rotation shaft so as to come close to and move away from the rotating disc;

a spring member that presses the sliding disc against the rotating disc; and an electromagnet that is able to pull the sliding disc in a direction for moving away from the rotating disc against spring force of the spring member; wherein the electromagnet includes a yoke and an exciting coil;

the yoke includes an outer cylindrical part and an inner cylindrical part, both of which are formed so as to be concentric each other, and a circular end plate part that blockades a rear end of a circular space formed between the outer cylindrical part and the inner cylindrical part;

the exciting coil is installed in the circular space; and a circular recess with a specified depth is formed in the circular end plate part of the yoke by making an inner circumference side of the circular end plate part bend forward in a step form in a sectional shape when cut along the axial line.

Next, an electromagnetic brake built-in type small-sized motor includes:

an electromagnetic brake device for locking rotation of a motor rotation shaft; wherein a shaft end part of a rear end extension part of the motor rotation shaft is supported through an intermediary of a bearing by a motor end plate;

the electromagnetic brake device is structured as described above; and the electromagnetic brake device is assembled to the rear end extension part of the motor rotation shaft in such a manner that a part of the bearing is housed in the circular recess of the electromagnetic brake device.

In the electromagnetic brake device of the present invention, the circular recess is formed at the center area of the circular end plate section of the yoke that defines the rear end surface of the electromagnetic brake device. Accordingly, as far as the electromagnetic brake device is assembled under a condition where the bearing supporting the rear end shaft part of the motor rotation shaft of the small-sized motor is housed in the circular recess, there appears no dead space at the rear end section of the small-sized motor. As a result, it becomes possible to shorten the shaft length of the small-sized motor in which the electromagnetic brake device is assembled.

REFERENCE NUMERALS

Figure 1:
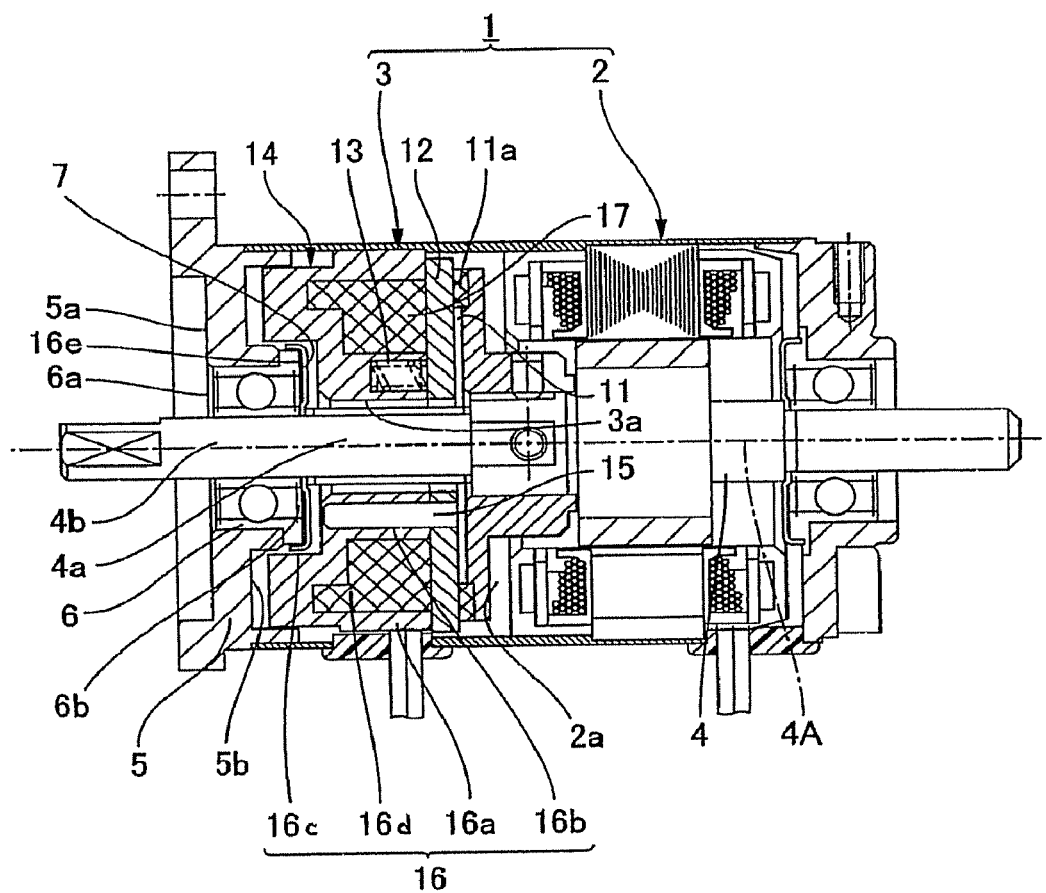
FIG. 1 is a longitudinal sectional view of a small-sized motor in which an electromagnetic brake device, to which the present invention is applied, is assembled.
Figure 2:
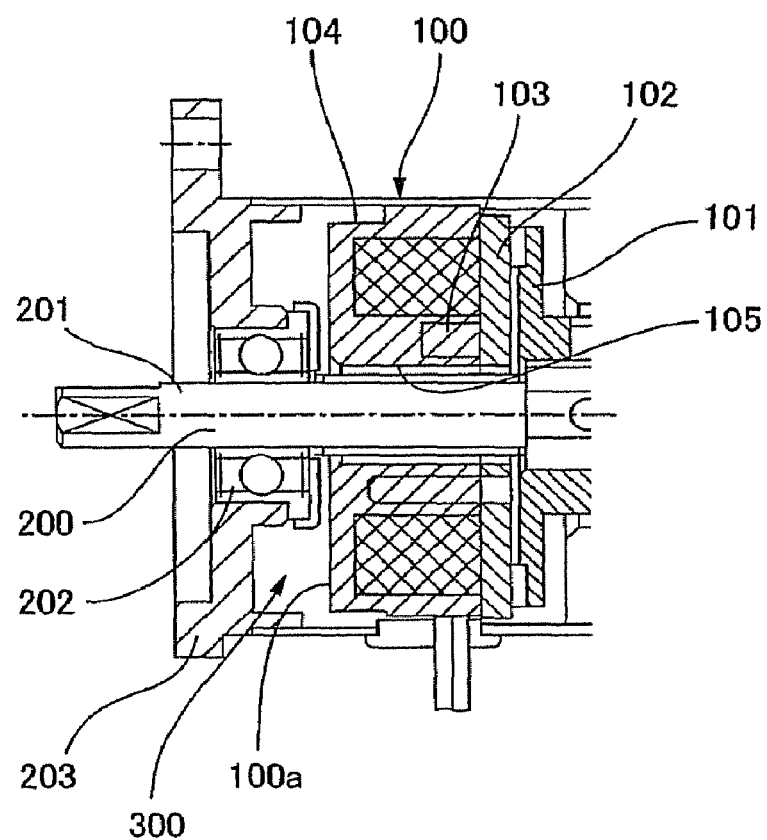
FIG. 2 is a partial longitudinal sectional view showing a state in which a conventional electromagnetic brake device is assembled in the small-sized motor of FIG. 1.

1. Small-sized motor
2. Motor main section
3. Electromagnetic brake device
4. Motor rotation shaft
5. Motor end plate
6. Bearing
11. Rotating disc
12. Sliding disc
13. Coil spring
14. Electromagnet
16. Yoke
16a. Outer cylindrical section
16b. Inner cylindrical section
16c. End plate section
16d. Circular space 16e. Circular recess
17. Exciting coil

BEST MODE FOR CARRYING OUT THE INVENTION

Described below with reference to the accompanying drawings is a small-sized motor of an electromagnetic brake built-in type, to which the present invention is applied.

FIG. 1 is a longitudinal sectional view showing a small-sized motor of the present example. A small-sized motor 1 includes; a motor main section 2 and an electromagnetic brake device 3 that is assembled into a rear end section of the motor main section 2.

From a rear end 2a of the motor main section 2, a rear end extension shaft part 4a of a motor rotation shaft 4 is extended. The rear end extension shaft part 4a passes concentrically through a center shaft hole 3a of the electromagnetic brake device 3 in a manner having play between the rear end extension shaft part 4a itself and the center shaft hole 3a. A shaft end part 4b of the rear end extension shaft part 4a of the motor rotation shaft 4, which protrudes from a rear end of the electromagnetic brake device 3 in a backward direction, is supported with a bearing 6 installed on an inner circumference surface of a center hole of a motor end plate 5 in such a manner that the motor rotation shaft 4 is rotatable. An outer end surface 6a of the bearing 6 is positioned on the same plane as an outer end surface 5a of the motor end plate 5, and an inner end surface 6b of the bearing 6 protrudes frontward from an inner end surface 5b of the motor end plate 5. Furthermore, the inner end surface 6b is covered with a dust stringer 7 so that a foreign material, such as a wear powder and so on, generated at the electromagnetic brake device 3 does not enter the bearing 6.

The electromagnetic brake device 3 assembled between the motor main section 2 and the motor end plate 5 includes; a rotating disc 11 fixed to the rear end extension shaft part 4a of the motor rotation shaft 4 so as to rotate together with the rear end extension shaft part 4a, a sliding disc 12 that is slidable along a shaft line 4A of the motor rotation shaft 4 in a direction so as to come close to and move away from the rotating disc 11, coil springs 13 that press the sliding disc 12 against the rotating disc 11, and an electromagnet 14 that is able to pull the sliding disc 12 in a direction for moving away from the rotating disc 11 while being against spring force of the coil springs 13. The coil springs 13 are laid out on one and the same circle line at regular angular intervals. Placed at an outer circumference part of an end surface, positioned at a side facing the sliding disc 12, of the rotating disc 11, is a friction plate 11a that is shaped like a ring. Furthermore, the sliding disc 12 is made of a magnetic material, and the sliding disc 12 slides along guide pins 15 that are fixed to the electromagnet 14. The guide pins 15 are laid out on one and the same circle line at regular angular intervals.

The electromagnet 14 includes; a cylindrical yoke 16 formed with a center shaft hole 3a, and an exciting coil 17 installed at an internal part of the yoke 16. The yoke 16 includes; an outer cylindrical part 16a and an inner cylindrical part 16b, both of which are formed so as to be concentric each other, and a circular end plate part 16c that blockades a rear end of a circular space 16d formed between the outer cylindrical part 16a and the inner cylindrical part 16b. The exciting coil 17 is installed in the circular space 16d.

The circular end plate part 16c is so formed in its longitudinal sectional shape (its sectional shape cut along its axial line) that an inner circumference side of the circular end plate part 16c bends forward in a step form. By having such a sectional figure, formed at a center section of the circular end plate part 16c is a circular recess 16e that is recessed with a specified depth in a direction from a rear side to a front side.

As shown in FIG. 1, under a condition where the electromagnetic brake device 3 provided with the structure described above is assembled to the rear end extension shaft part 4a of the motor rotation shaft 4, a front side section of the bearing 6 installed in the motor end plate 5 gets inserted into the circular recess 16e from a rear side of the circular recess 16e. As a result, almost no dead space is formed in an outer circumference area of the bearing 6 between the motor end plate 5 and a rear end surface of the electromagnetic brake device 3 (namely, a rear end surface of the yoke).

Thus, in a case of the small-sized motor 1 of the present example, almost no dead space is formed in a rear end section where the electromagnetic brake device 3 is assembled. Therefore, it becomes possible to shorten a shaft length of the small-sized motor in comparison with a conventional small-sized motor having an electromagnetic brake device built in.

The invention claimed is:

1. An electromagnetic brake built-in type small-sized motor comprising:
   an electromagnetic brake device for locking rotation of a motor rotation shaft; wherein
   the electromagnetic brake device is assembled between a motor main section and a motor end plate, and a shaft end part of a rear end extension part of the motor rotation shaft is rotatably supported by the motor end plate via a bearing;
   the electromagnetic brake device comprises:
   a rotating disc fixed to the motor rotation shaft so as to rotate together with the motor rotation shaft;
   a sliding disc that is slidable along an axial line of the motor rotation shaft so as to come close to and move away from the rotating disc;
   a spring member that presses the sliding disc against the rotating disc; and
   an electromagnet that is able to pull the sliding disc in a direction for moving away from the rotating disc while being against a spring force of the spring member; wherein
   the electromagnet includes a yoke and an exciting coil;
   the yoke includes an outer cylindrical part and an inner cylindrical part, both of which are formed so as to be concentric each other, and a circular end plate part that blockades a rear end of a circular space formed between the outer cylindrical part and the inner cylindrical part;
   the exciting coil is installed in the circular space;
   a circular recess with a specified depth is formed in the circular end plate part of the yoke by having an inner circumference side of the circular end plate part bend forward in a step form in a sectional shape cut along the axial line; and
   the electromagnetic brake device is assembled to the rear end extension part of the motor rotation shaft in such a manner that a part of the bearing is housed in the circular recess of the electromagnetic brake device.

2. The electromagnetic brake built-in type small-sized motor according to claim 1, wherein an inner end surface of the bearing facing the electromagnetic brake device is covered with a dust stringer.

* * * * *